United States Patent

[11] 3,545,621

| [72] | Inventor | Jean P. Lamort<br>Vitry-Le-Francois, France |
| --- | --- | --- |
| [21] | Appl. No. | 737,160 |
| [22] | Filed | June 14, 1968 |
| [45] | Patented | Dec. 8, 1970 |
| [73] | Assignee | Etablissements E. & M. Lamort Fils<br>Vitry-Le-Francois, France |
| [32] | Priority | June 12, 1967 |
| [33] | | France |
| [31] | | No. 110,268 |

[54] APPARATUS FOR PURIFYING LIQUIDS CARRYING SUSPENDED SOLID PARTICLES, CHIEFLY PULP FOR PAPER MILLS
5 Claims, 6 Drawing Figs.

[52] U.S. Cl. .................................................. 210/298,
209/273, 210/304, 210/333, 210/336, 210/338,
210/414
[51] Int. Cl. ........................................................ B01d 35/22,
B01d 29/38
[50] Field of Search........................................... 209/273,
306, 379; 210/197, 298, 304, 332, 333, 334, 336,
338, 342, 413, 414, 415

[56] References Cited
UNITED STATES PATENTS

| 3,092,578 | 6/1963 | Cannon et al................. | 210/415X |
| --- | --- | --- | --- |
| 3,174,622 | 3/1965 | Lamort........................ | 210/415X |
| 3,223,239 | 12/1965 | Dick............................ | 209/273X |
| 2,975,899 | 3/1961 | Cannon et al................. | 210/415X |

*Primary Examiner*—Frank A. Spear, Jr.
*Attorney*—Michael S. Striker

ABSTRACT: The apparatus includes a vat inside which the liquid to be purified is caused to flow through two successive coaxial sieves, one of said sieves being arranged within or above the other. In the first case, the liquid passes radially through both sieves and in the second case longitudinally inside the alined sieves. A single bladed rotor revolves inside the vat between the two coaxial sieves or inside the alined sieves so as to produce surges of increased and/or reduced pressures on the downstream side of one sieve and on the upstream side of the other sieve, which surges lead to local return flow through the openings of the sieves and thereby to a cleaning of the latter.

INVENTOR:
Jean Pierre Lamort

By: Michael S. Striker
Attorney

INVENTOR:
Jean Pierre Lamort
By: Michael J. Strike

APPARATUS FOR PURIFYING LIQUIDS CARRYING SUSPENDED SOLID PARTICLES, CHIEFLY PULP FOR PAPER MILLS

The present invention has for its object an apparatus for purifying aqueous suspensions of solid products, chiefly pulp for paper mills.

Many extant apparatus intended for such a purification are constituted chiefly by a sieve through which the suspension to be purified is caused to pass so as to stop the foreign material which is not capable of passing through it. Said sieve is generally cleaned in a continuous manner by bars of a hydrodynamic outline moving in parallelism with its surface and in proximity thereto.

Arrangements controlling the direction of flow of the liquid and the relative positions of the sieve with reference to the movable bars are provided in such extant apparatus which can be classified as follows:

centrifugally operated apparatus wherein the suspension is fed into a cylindrical sieve and flows then outwardly of the latter. The movable bars are located inside the sieve and assume a rotary movement round an axis registering with the axis of the sieve.

Centripetally operated apparatus wherein the suspension is fed from the outside into the cylindrical sieve. The cleaning bars assume a rotary movement round the axis of the sieve and may, in this case, be located either outside or inside the sieve, that is within the purified suspension.

Lastly those apparatus which combine the two above defined systems and wherein the suspension is fed into the annular gap between two coaxial cylindrical sieves so as to flow both outwardly through the outer sieve and inwardly through the inner sieve.

The openings provided in the sieves may assume different shapes and the sieves generally used for the retention of fibres intended for the manufacture of paper are provided either with round holes or else with elongated rectilinear slots. It is a well known fact that each type of opening is better for retaining certain kinds of impurities the slots being more efficient for arresting granular particles and affording a passage for flat and thin particles which latter are more efficiently arrested by round holes.

The pulp used in the paper manufacturing industry contains very numerous and manifold particles and requires essentially the use of purifying apparatus providing a mechanical structure as simple as possible, to obtain the same results as those obtained with a plurality of successive sieves of different designs, and according to the present invention the apparatus comprises a slotted sieve and a sieve of the round hole type arranged in series.

The present invention has for its object to satisfy such requirements by means of an apparatus for the purification of liquids carrying a suspension of solid particles as for instance pulp used in the paper-manufacturing industry. Said apparatus includes a vat enclosing a cylindrical sieve and a bladed rotor, the rotation of which produces increased and reduced pressure pulses at one side of said sieve to keep it in a clean condition thereby. According to the invention, a second sieve is arranged in series with the first sieve coaxially therewith within the same vat whereby a two-stage purification is obtained, the bladed rotor being located in a manner such that it produces pressure pulses on the upstream side of the first sieve and on the downstream side of the second sieve or conversely on the downstream side of the first sieve and on the upstream side of the second sieve with reference to the direction of flow of the liquid. The purifying apparatus is furthermore optionally executed as follows:

The apparatus may be constituted by a vat provided with a tangentially extending input of liquid and enclosing coaxially a first cylindrical sieve, the inner surface of which is swept, as well known per se, by the blades of a rotor also coaxial with the vat and producing pressure surges, while a first output draining the solid particles kept back by the first sieve is provided at the lower end of the annular space extending between the first sieve and the vat: the apparatus includes furthermore a second cylindrical sieve coaxial with the first mentioned sieve, the diameter of which is smaller than that of the latter and the outer surface of which is swept by the blades of the above-mentioned rotor so as to be subjected to pulses of a reduced pressure by said blades and a second output draining the solid particles kept back by said second sieve is provided at the lower end of the annular gap separating the two sieves: the liquid flowing through said second sieve is collected beyond the latter inside an annular space defined between said second sieve and a cylindrical support for the second sieve and for the rotor shaft, said support being coaxially rigid with the vat and being provided with an output for the purified liquid.

According to a modification, the apparatus comprises a vat provided with a tangential input of liquid and enclosing coaxially a cylindrical sieve, the inner surface of which is swept, as well known per se, by the blades of a rotor while a horizontal partition extends across the annular space separating the sieve from the vat so that the liquid passes first through the section of the sieve lying above said partition from the outside towards the inside and thereafter in the opposite direction through the section of the sieve lying underneath the partition, that is from the inside towards the outside, the lower annular gap underneath the partition being provided to this end with an output for the purified liquid while the upper annular gap above said partition is provided in registry with said partition with an output draining the solid particles kept back by the upper section of the sieve, a further output being provided in the lower part of the vat for the solid particles kept back by the lower section of the sieve; the blades of the rotor are arranged so as to exert an overpressure on the section of the sieve lying above the horizontal partition and a reduced pressure on the section of the sieve lying underneath said horizontal partition.

In either case, the first sieve or sieve section may be provided with circular perforations and the second one with rectilinear slots or conversely the first sieve or sieve section may be provided with rectilinear slots and the second one with circular perforations. The slots may extend along generating lines of the cylindrical sieve or sieve sections and open each on the downstream side of the sieve into a clearance showing an edge sloping markedly in a direction opposed to that of the rotation of the blades, while the other edge extends radially with reference to the sieve.

The accompanying drawings illustrate by way of explanatory examples two embodiments of the invention. In said drawings.

Figure 1:
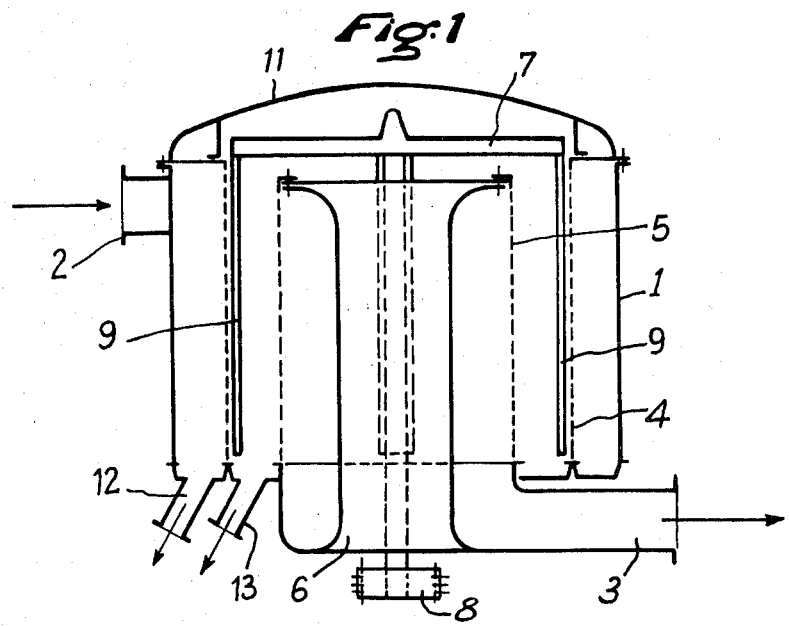
FIG. 1 is a diagrammatic vertical cross section of a first improved purifying apparatus.

Turning to the drawings, it is apparent that the apparatus includes chiefly a vat 1 having a vertical axis and provided with an input neck 2 and an output neck 3. Inside said vat 1 are arranged on the one hand two coaxial cylindrical sieves 4 and 5 having a vertical axis and on the other hand a support 6 coaxially standing inside the sieves and the upper end of which carries a mechanism including a wheel 7 driven into rotation by a gear 8 located at the lower end of the support. The wheel 7 is rigid with vertical depending bars 9 and 10 moving when rotating in unison with the wheel 7 in parallelism with the generating lines of the cylindrical sieves 4 and 5. The bars 9 are arranged in proximity with the sieve 4 and the bars 10 in proximity with the sieve 5. The cross sections of said bars 9 and 10 have hydrodynamic outlines designed so that the movement of the bars within the aqueous suspension increases the pressure on the inside of the outer sieve 4 and reduces the pressure on the outer surface of the sieve 5. The upper end of the vat 1 is closed by a cover 11 which which furthermore secures tightly in position the outer sieve 4 which is thus held fast between said cover and the bottom of the vat 1. The inner sieve 5 is secured through its upper end to the support 6 carrying the mechanism while its lower end rests also on the bottom of the vat 1. A nozzle 12 is inserted in the bottom of the vat 1 on the outside of the outer sieve 4 and a further nozzle 13 is similarly inserted in the bottom of the vat 1 in registry with the gap between the two sieves 4 and 5. Said nozzles serve for the draining off of the solid particles adhering to the outer surfaces of the sieves 4 and 5 respectively.

The operation of the apparatus is as follows: the suspension to be purified enters the vat 1 through the input neck 2 and fills it. It flows out of the vat through the output neck 3 after it has passed in succession through the sieves 4 and 5. The openings provided in said sieves are kept clear by the bars 9 and 10. The raised pressure obtained on the outer surface of the bars 9 produces at all the points of the sieve 4 facing said bars 9 passing in front of them a surge of a small amount of liquid back through said sieve which is thus cleaned. Similarly the reduced pressure prevailing on the inner surface of the bars 9 produces at all the points of the inner sieve 5 facing said bars 10 passing in front of them, a surge of liquid back through said sieve whereby the openings in the latter are again cleaned by a countercurrent effect.

Obviously the apparatus may be further simplified by using sieves 4 and 5, the diameters of which are sufficiently near each other for it to be possible to clean both sieves by the same series of bars. A single series of bars would then replace the two series of bars 9 and 10.

The impurities collected by the sieve 4 are removed by a periodical or continuous draining through the nozzle 12. Similarly the impurities collected by the sieve 5 are drained periodically or continuously through the nozzle 13.

Figure 5:
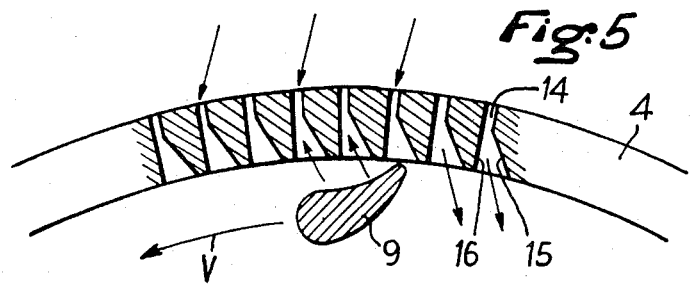
FIG. 5 is a detail sectional view of a slotted is sieve.
Figure 3:
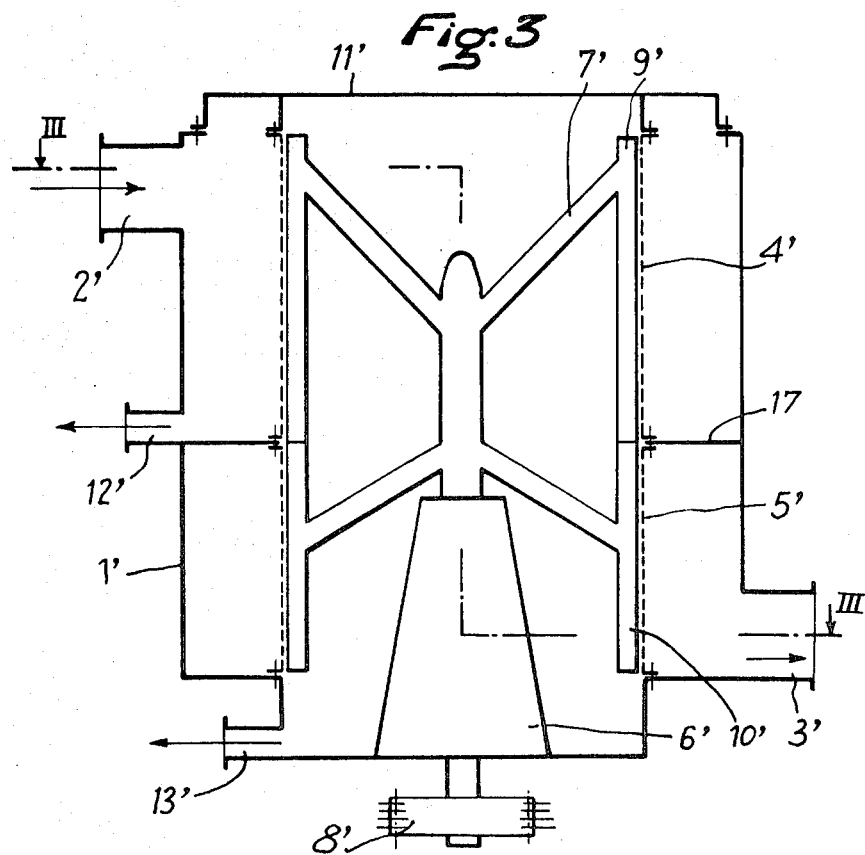
FIG. 3 is a diagrammatic vertical cross section of a second embodiment of the improved purifying apparatus.

The improved apparatus described allows thus performing two successive filterings without any intricate mechanical contrivance since it includes, as in any conventional apparatus, only one rotor, the movement of said rotor ensuring the cleaning of both sieves. As already disclosed, it is of interest to execute two filterings in succession if two sieves of a different design are used, chiefly if one is slotted and the other provided with round holes. However, in accordance with the well-known fact that the efficiency of a round-holed sieve is higher when the fluid impinges against it with a sufficiently large tangential speed, it is generally preferable to provide round holes in the inner sieve 5 since the fluid impinges against the input side of the latter with the higher rotary speed assumed by it under the action of the rotary bars 9 and 10. Consequently, the outer sieve 4 should be a slotted one against which the fluid impinges with a comparatively high speed, which forms a suitable arrangement since the filtering executed by the latter depends solely on the breadth or fineness of the slots. Under the same conditions, it is preferable to provide the sieve 4 with slots 14 extending (FIG. 5) along the generating lines of the outer cylindrical sieve 4 and opening on the inner side of the latter with a dissymmetrical clearance. As well known in the techniques relating to cellulose and paper, the fine slots commonly used for the filtering of fibrous suspensions open preferably at their output ends with a clearance so as to prevent the channel formed by the actual slot from being too long which might lead to an easy clogging. Now, said clearance is conventionally symmetrical and assumes either a flaring shape or else a rectangular shape with rounded edges.

In the case illustrated, the sieve 4 is cleaned by the passage of a bar 9 along its inner surface. The pressure which is increased on the outer surface of said bar produces a surge of liquid through the sieve 4 and the liquid impinges against the latter with a speed the component of which parallels with the surface of the sieve 4 is high, and consequently it is of interest to further the return surges through the slots 14 by giving the clearances in the latter slopes inclined as much as possible in the direction of said surges. With a view to making the execution easier, the clearances may advantageously assume the shape illustrated in FIG. 5 and be defined by a first face sloping as much as possible rearwardly away from the direction of rotation of the bars 9 and by a second radial face. A comparison of the efficiency under similar conditions between such a clearance and a conventional symmetrical trapezoidal clearance has shown that the dissymmetrical clearance according to the present invention allows obtaining surges progressing through the slots 14 at a speed 50 percent higher than that obtained with symmetrical clearances, which is of course very advantageous for the proper cleaning of the sieve.

Figure 4:
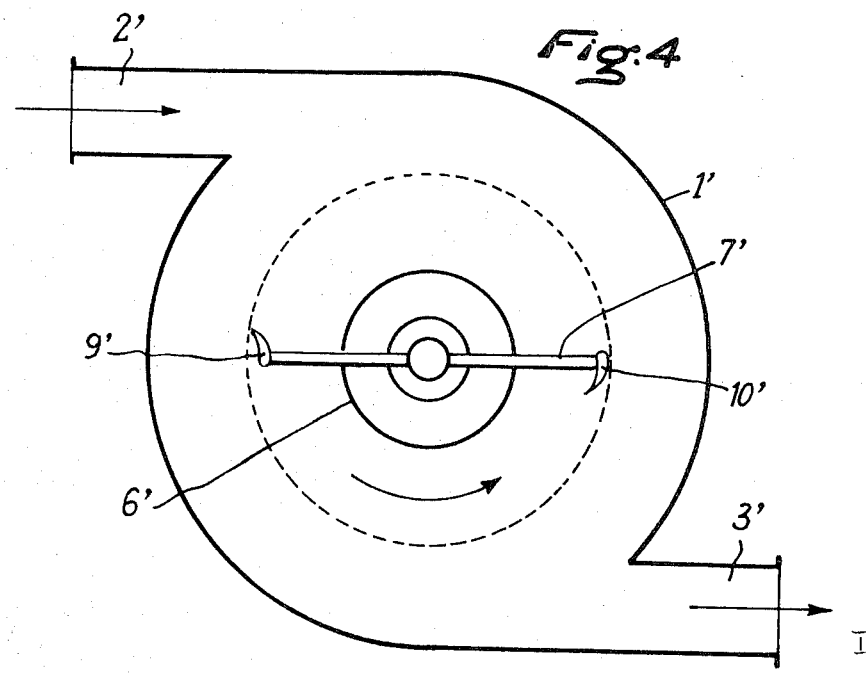
FIG. 4 is a cross section through line IV–IV of FIG. 3.

Instead of arranging the two sieves 4 and 5 coaxially one inside the other, said sieves may form a single unit as illustrated in FIG. 4 in which a single vertical sieve includes two superposed sections 4' and 5' while a partition 17 extends across the annular gap between the sieve and the vat 1' in horizontal registry with the geometrical circle separating the sieve sections 4' and 5'.

In such a case, the fluid to be purified enters centripetally through the input neck 2' and through the upper sieve section 4' into the interior of the latter and thence it passes centrifugally through the lower sieve section 5' to the outside of the latter so as to be exhausted through the output neck 3'. The impurities collected by the sieve section 4' are removed through the nozzle 12' while those collected by the sieve section 5' are removed through the nozzle 13'. The sieve sections 4' and 5' are cleaned by countercurrent surges produced by the movement of the corresponding upper and lower hydrodynamic bars 9' and 10' rotating in unison.

Figure 2:
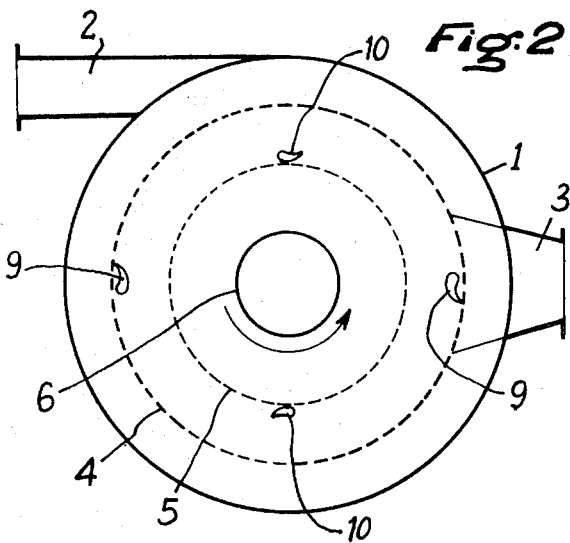
FIG. 2 is a cross section through line II–II of FIG. 1.

Briefly stated, the operation of this last embodiment is similar to that of the first described embodiment the sole difference residing in that the sieve section 5' of said last embodiment operates centrifugally whereas the corresponding inner sieve 5 illustrated in FIGS. 1 and 2 operates centripetally. The disclosure relating to the nature and arrangement of the round and slotted perforations of the sieves of the first embodiment is applicable obviously to the sieve sections of the second embodiment.

Figure 6:
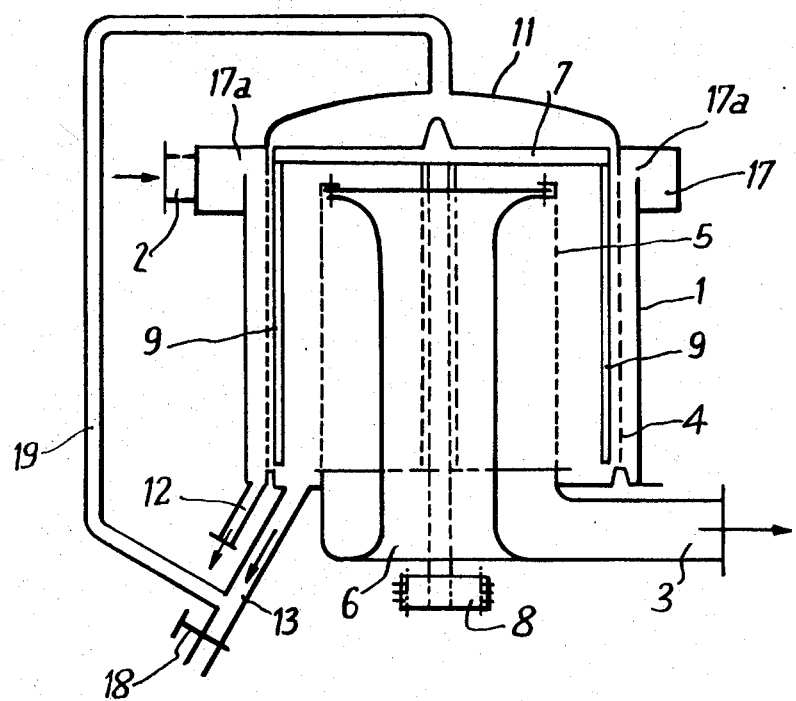
FIG. 6 is a diagrammatic vertical cross section of a third embodiment.

In certain particular cases of pulp it can be advantageous to facilitate the filtering by disposing the input neck in a particular manner. For instance instead of fixing the tangential input neck directly to the vat 1 it can be fixed to an annular space 17 (see FIG. 6) provided at the upper part of the vat 1 and communicating with the latter through an annular aperture 17a formed by the top face of the annular space 17 and the upper rim of the vat 1 (FIG. 6).

It is important in this embodiment that the sieve 4 ends about at the same height as the upper rim of the vat 1 and that the ratio of the diameters of the vat 1 and the sieve 4 is comprised between the value of 1.05 and 1.15 but is preferably equal to 1.1. In this way the fluid flows downwardly towards the nozzle 12 carrying along the impurities.

If it is desired to carry out another filtering of the liquid withdrawn from the nozzle 13 it is sufficient to dispose a tap 18 at its end and to fix a tube between the nozzle 13 and the center of the cover 11. The liquid will circulate without requiring a pump because of the greater pressure prevailing in the neighborhood of the blades 7 compared to the pressure prevailing at the center of the cover 11.

I claim:

1. An apparatus for purifying liquids carrying a suspension of solid particles, especially pulp for paper mills, comprising a vat having inlet and outlet means; two coaxial cylindrical sieves arranged superimposed upon each other in said vat, one of said sieves being provided with substantially circular holes and the other with elongated slots; wall means in said vat and comprising a transverse wall extending between said vat and adjacent ends of said superimposed sieves, said wall means cooperating with said sieves for constraining liquid fed through said inlet means into said vat to flow in succession through said sieves before the liquid is discharged through said outlet means; rotor means coaxial with said sieves and having blades arranged for movement along one surface of each sieve for producing surges in the liquid urging the liquid in countercurrent direction through the corresponding sieve to clean the latter; drive means for rotating the rotor about its axis; and means for discharging solid particles retained by said sieves from the interior of said vat.

2. An apparatus for purifying liquids carrying a suspension of solid particles, especially pulp for paper mills, comprising a vat having inlet and outlet means; two coaxial cylindrical sieves arranged in said vat, one of said sieves being provided with substantially circular holes and the other with elongated slots; wall means in said vat and cooperating with said sieves for constraining liquid fed through said inlet means into said vat to flow in succession through said sieves before the liquid is discharged through said outlet means; rotor means coaxial with said sieves and having blades arranged for movement along one surface of each sieve for producing surges in the liquid urging the liquid in countercurrent direction through the corresponding sieve to clean the latter, said elongated slots in said other sieve extend along generating lines of said sieve and one of the faces defining each slot has a face portion adjacent the path of the respective blade and sloping in direction away from the direction of rotation of said rotor means, and an adjoining face portion which extends in substantially radial direction of said sieve; drive means for rotating the rotor about its axis; and means for discharging solid particles retained by said sieves from the interior of said vat.

3. An apparatus as defined in claim 2, wherein said inlet means comprise wall means defining an annular space arranged at the upper end of said vat and an inlet tube arranged for discharging fluid in substantial tangential direction into said annular space, said annular space communicates with the interior of said vat through an annular opening defined between the upper edge of said vat and the upper face of said annular space.

4. An apparatus as defined in claim 2, wherein said one sieve is arranged within the other and wherein said blades are arranged between said sieves, at least one of the blades is arranged for movement along the inner surface of the outer sieve and at least one of the blades is arranged for movement along the outer surface of the inner sieve.

5. An apparatus as defined in claim 4, wherein the ratio of the diameter of the vat to the diameter of the outer sieve is between 1.05 and 1.15.

PO-1050
(5/69)

UNITED STATES PATENT OFFICE
CERTIFICATE OF CORRECTION

Patent No. 3,545,621            Dated December 8, 1970

Inventor(s) Jean Pierre Lamort

It is certified that error appears in the above-identified patent and that said Letters Patent are hereby corrected as shown below:

On the first page of the patent, the indication appearing under [32] is corrected so as to read as follows:

-- Priority June 14, 1967 --

Signed and sealed this 1st day of June 1971.

(SEAL)
Attest:

EDWARD M. FLETCHER, JR.
Attesting Officer

WILLIAM E. SCHUYLER, JR.
Commissioner of Patents